(12) United States Patent
Xu

(10) Patent No.: US 11,963,179 B2
(45) Date of Patent: Apr. 16, 2024

(54) METHODS, APPARATUS AND SYSTEMS FOR SCHEDULING RESOURCES IN A WIRELESS COMMUNICATION

(71) Applicant: ZTE CORPORATION, Guangdong (CN)

(72) Inventor: Jing Xu, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 499 days.

(21) Appl. No.: 17/199,188

(22) Filed: Mar. 11, 2021

(65) Prior Publication Data
US 2021/0204256 A1 Jul. 1, 2021

Related U.S. Application Data

(63) Continuation of application No. PCT/CN2018/106669, filed on Sep. 20, 2018.

(51) Int. Cl.
H04W 72/23 (2023.01)
H04W 74/0833 (2024.01)

(52) U.S. Cl.
CPC ....... *H04W 72/23* (2023.01); *H04W 74/0833* (2013.01)

(58) Field of Classification Search
None
See application file for complete search history.

(56) References Cited

U.S. PATENT DOCUMENTS

| 10,945,248 | B2 * | 3/2021 | Takeda | H04L 5/0053 |
| 2010/0303011 | A1 * | 12/2010 | Pan | H04L 5/001 |
| | | | | 370/328 |
| 2013/0301541 | A1 * | 11/2013 | Mukherjee | H04W 74/0833 |
| | | | | 370/329 |
| 2016/0073381 | A1 * | 3/2016 | Ratasuk | H04W 72/23 |
| | | | | 370/329 |
| 2017/0273056 | A1 * | 9/2017 | Papasakellariou | H04W 52/281 |

(Continued)

FOREIGN PATENT DOCUMENTS

| CN | 107529210 A | 12/2017 |
| WO | 2017169461 A1 | 10/2017 |

OTHER PUBLICATIONS

ZTE, "Consideration for paging on multi-carrier in NB-IoT", 3GPP TSG-RAN WG2 Meeting#95, Gothenburg, Sweden, R2-164858, Aug. 26, 2016 (Aug. 26, 2016), 3 pages.

*Primary Examiner* — Mariela Vidal Carpio
(74) *Attorney, Agent, or Firm* — Duane Morris LLP

(57) ABSTRACT

Methods, apparatus and systems for scheduling resources in a wireless communication are disclosed. In one embodiment, a method performed by a wireless communication node is disclosed. The method comprises: transmitting first resource information to a wireless communication device, wherein the first resource information comprises information related to a first resource associated with the wireless communication device; receiving a request from the wireless communication device on the first resource for a data transmission between the wireless communication node and the wireless communication device; and allocating, to the wireless communication device, a second resource in response to the request, wherein the second resource is configured to be utilized for the data transmission according to the request.

10 Claims, 11 Drawing Sheets

(56) References Cited

U.S. PATENT DOCUMENTS

| | | | | |
|---|---|---|---|---|
| 2017/0303317 A1* | 10/2017 | Islam | .................... | H04W 72/12 |
| 2017/0332419 A1* | 11/2017 | Kim | ..................... | H04L 1/1861 |
| 2017/0339722 A1* | 11/2017 | Jiao | ..................... | H04W 68/02 |
| 2018/0020432 A1 | 1/2018 | Rico Alvarino et al. | | |
| 2018/0077722 A1* | 3/2018 | Awad | ................ | H04W 72/0446 |
| 2018/0205516 A1* | 7/2018 | Jung | .................... | H04L 5/0007 |
| 2018/0343683 A1* | 11/2018 | Shao | ................. | H04W 74/0833 |
| 2019/0215211 A1* | 7/2019 | Xue | ..................... | H04L 5/0051 |
| 2020/0092913 A1* | 3/2020 | Xu | ..................... | H04W 74/0816 |
| 2021/0076306 A1* | 3/2021 | Tamura | ............ | H04W 74/0833 |
| 2021/0084650 A1* | 3/2021 | Fan | ..................... | H04L 5/0098 |
| 2021/0127424 A1* | 4/2021 | Yasukawa | ............ | H04W 16/28 |
| 2021/0320838 A1* | 10/2021 | Lee | .................... | H04L 41/0677 |
| 2021/0321360 A1* | 10/2021 | Wong | ................... | H04W 68/00 |
| 2022/0256587 A1* | 8/2022 | Fujishiro | .............. | H04W 72/21 |

\* cited by examiner

METHODS, APPARATUS AND SYSTEMS FOR SCHEDULING RESOURCES IN A WIRELESS COMMUNICATION

TECHNICAL FIELD

The disclosure relates generally to wireless communications and, more particularly, to methods, apparatus and systems for scheduling resources in a wireless communication.

BACKGROUND

Mobile communications have a rapid development such that they have brought tremendous influence to people's life, work, social, political and economic aspects. Human society has entered an era of information, where all kinds of business applications have shown explosive growth in demand. Mobile networks can not only provide communications between people, but also serve massive equipment of the Internet of Things (IoT).

In a communication system, e.g. an IoT communication system, a terminal may need to send an indication or a request to the base station for various reasons. For example, because the uplink resources of a terminal are all determined by the scheduling of the base station, when the terminal has uplink data to be transmitted but the base station does not allocate uplink resources, the terminal needs to send an uplink scheduling request to the base station, such that the base station allocates uplink resources for the uplink data transmission. In an existing standard protocol of the narrowband Internet of Things (NB-IoT) communication system, a standard for transmitting an uplink scheduling request on a dedicated narrowband physical random access channel (NPRACH) resource is introduced. That is, a random access preamble sequence is sent as an uplink scheduling request on the configured non-contention NPRACH. After the terminal sends the random access preamble sequence on the dedicated NPRACH resource, according to an existing non-contention random access procedure, a downlink random access response message needs to be scheduled by a narrowband physical downlink control channel (NPDCCH) scrambled by a random access radio network temporary identifier (RA-RNTI). The downlink random access response message carries information for authorized uplink resource. The terminal can send the uplink data on the authorized uplink resource. It is unnecessary and a waste of downlink resource to send to the downlink random access response message during the resource scheduling. In addition, after the terminal transmits a request on NPRACH, the terminal starts a timer to listen to PDCCH within the timer. If no PDCCH is received before the timer expires, the terminal in an existing system transmits an additional request on NPRACH even if there is no request generated by the trigger source, which is a waste of resource as well. Thus, existing systems and methods for scheduling resources in a wireless communication are not entirely satisfactory.

SUMMARY OF THE INVENTION

The exemplary embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

In one embodiment, a method performed by a wireless communication node is disclosed. The method comprises: transmitting first resource information to a wireless communication device, wherein the first resource information comprises information related to a first resource associated with the wireless communication device; receiving a request from the wireless communication device on the first resource for a data transmission between the wireless communication node and the wireless communication device; and allocating, to the wireless communication device, a second resource in response to the request, wherein the second resource is configured to be utilized for the data transmission according to the request.

In another embodiment, a method performed by a wireless communication device is disclosed. The method comprises: receiving first resource information from a wireless communication node, wherein the first resource information comprises information related to a first resource associated with the wireless communication device; and transmitting, to the wireless communication node, a request on the first resource for a data transmission between the wireless communication node and the wireless communication device, wherein the request is configured to be utilized by the wireless communication node to allocate a second resource to the wireless communication device, wherein the second resource is configured for the data transmission according to the request.

In a different embodiment, a wireless communication node configured to carry out a disclosed method in some embodiment is disclosed. In another embodiment, a wireless communication device configured to carry out a disclosed method in some embodiment is disclosed. In yet another embodiment, a non-transitory computer-readable medium having stored thereon computer-executable instructions for carrying out a disclosed method in some embodiment is disclosed.

BRIEF DESCRIPTION OF THE DRAWINGS

Various exemplary embodiments of the present disclosure are described in detail below with reference to the following Figures. The drawings are provided for purposes of illustration only and merely depict exemplary embodiments of the present disclosure to facilitate the reader's understanding of the present disclosure. Therefore, the drawings should not be considered limiting of the breadth, scope, or applicability of the present disclosure. It should be noted that for clarity and ease of illustration these drawings are not necessarily drawn to scale.

DETAILED DESCRIPTION OF EXEMPLARY EMBODIMENTS

Figure 1:
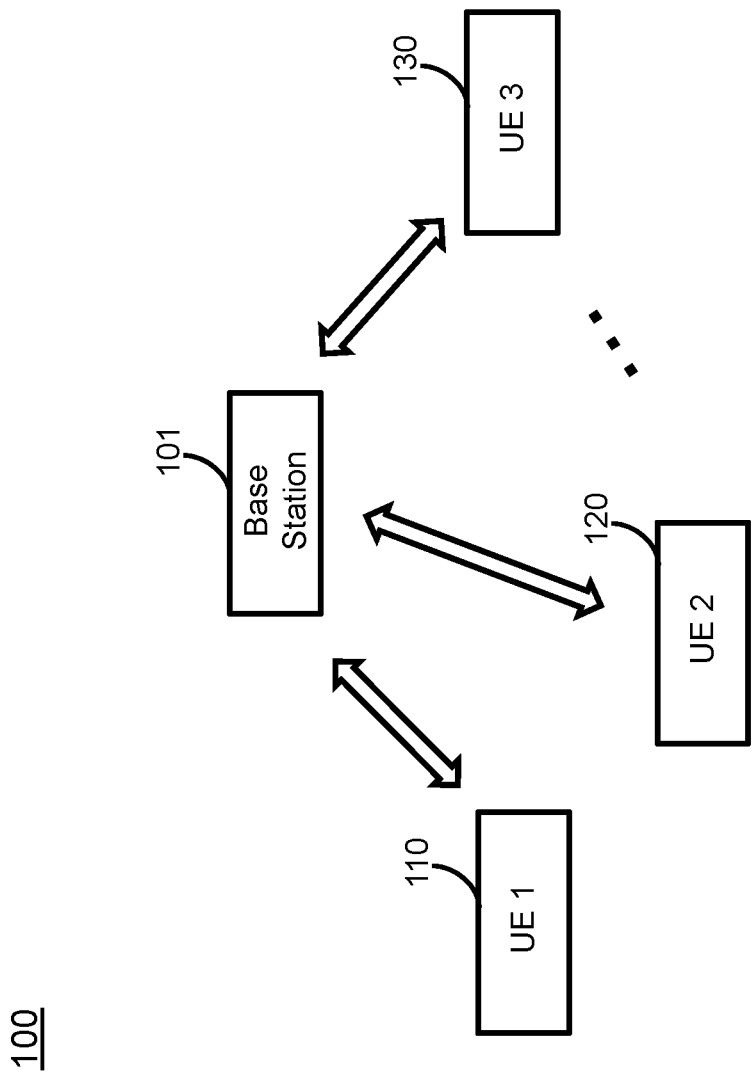
FIG. 1 illustrates an exemplary communication network in which techniques disclosed herein may be implemented, in accordance with some embodiments of the present disclosure.

Various exemplary embodiments of the present disclosure are described below with reference to the accompanying figures to enable a person of ordinary skill in the art to make and use the present disclosure. As would be apparent to those of ordinary skill in the art, after reading the present disclosure, various changes or modifications to the examples described herein can be made without departing from the scope of the present disclosure. Thus, the present disclosure is not limited to the exemplary embodiments and applications described and illustrated herein. Additionally, the specific order and/or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

A typical wireless communication network includes one or more base stations (typically known as a "BS") that each provides geographical radio coverage, and one or more wireless user equipment devices (typically known as a "UE") that can transmit and receive data within the radio coverage. In the wireless communication network, a BS and a UE can communicate with each other via a communication link, e.g., via a downlink radio frame from the BS to the UE or via an uplink radio frame from the UE to the BS.

The present disclosure provides methods for a terminal or a UE to directly schedule resources after transmitting a request, e.g. an uplink scheduling request, on a dedicated resource, thereby reducing the waste of downlink resource. In one embodiment, a BS may transmit information about a first resource, e.g. a dedicated physical random access channel (PRACH) resource, to a UE. The UE may transmit a request on the first resource for a downlink or uplink data transmission between the BS and the UE. In response to the request, the BS can allocate and transmit to the UE a second resource to be utilized for the downlink or uplink data transmission according to the request, e.g. via a physical downlink control channel (PDCCH) scrambled by a cell radio network temporary identifier (C-RNTI) corresponding to the UE.

In one embodiment, the second resource is transmitted according to a starting time of the PDCCH, and a certain timing relationship needs to be met between the starting time of the PDCCH and an ending time of the dedicated PRACH that carries the request. Similarly, after the UE transmits the request on the dedicated PRACH resource, the UE starts monitoring the PDCCH after a time period according to the certain timing relationship. The second resource may be transmitted in either a dedicated search space specific to the UE or a common search space common to multiple UEs including the UE. The UE may use a timer to control the time of monitoring the PDCCH in the common search space.

In various embodiments, a BS may be referred to as a network side node and can include, or be implemented as, a next Generation Node B (gNB), an E-UTRAN Node B (eNB), a Transmission Reception Point (TRP), an Access Point (AP), a donor node (DN), a relay node, a core network (CN) node, a RAN node, a master node, a secondary node, a distributed unit (DU), a centralized unit (CU), etc. A UE in the present disclosure can be referred to as a terminal and can include, or be implemented as, a mobile station (MS), a station (STA), etc. A BS and a UE may be described herein as non-limiting examples of "wireless communication nodes;" and a UE may be described herein as non-limiting examples of "wireless communication devices." The BS and UE can practice the methods disclosed herein and may be capable of wireless and/or wired communications, in accordance with various embodiments of the present disclosure.

FIG. 1 illustrates an exemplary communication network 100 in which techniques disclosed herein may be implemented, in accordance with some embodiments of the present disclosure. As shown in FIG. 1, the exemplary communication network 100 includes a base station (BS) 101 and a plurality of UEs, UE 1 110, UE 2 120 ... UE 3 130, where the BS 101 can communicate with the UEs according to wireless protocols.

In one embodiment, a UE, e.g. the UE 1 110, may need to transmit uplink (or downlink) data to the BS 101 which has not allocated any uplink (or downlink) resource for the UE. As such, the UE can send a request to the BS 101 which will schedule a transmission resource in response to the request, and transmit to the UE a PDCCH downlink control information (DCI) that indicates the transmission resource.

Figure 2:
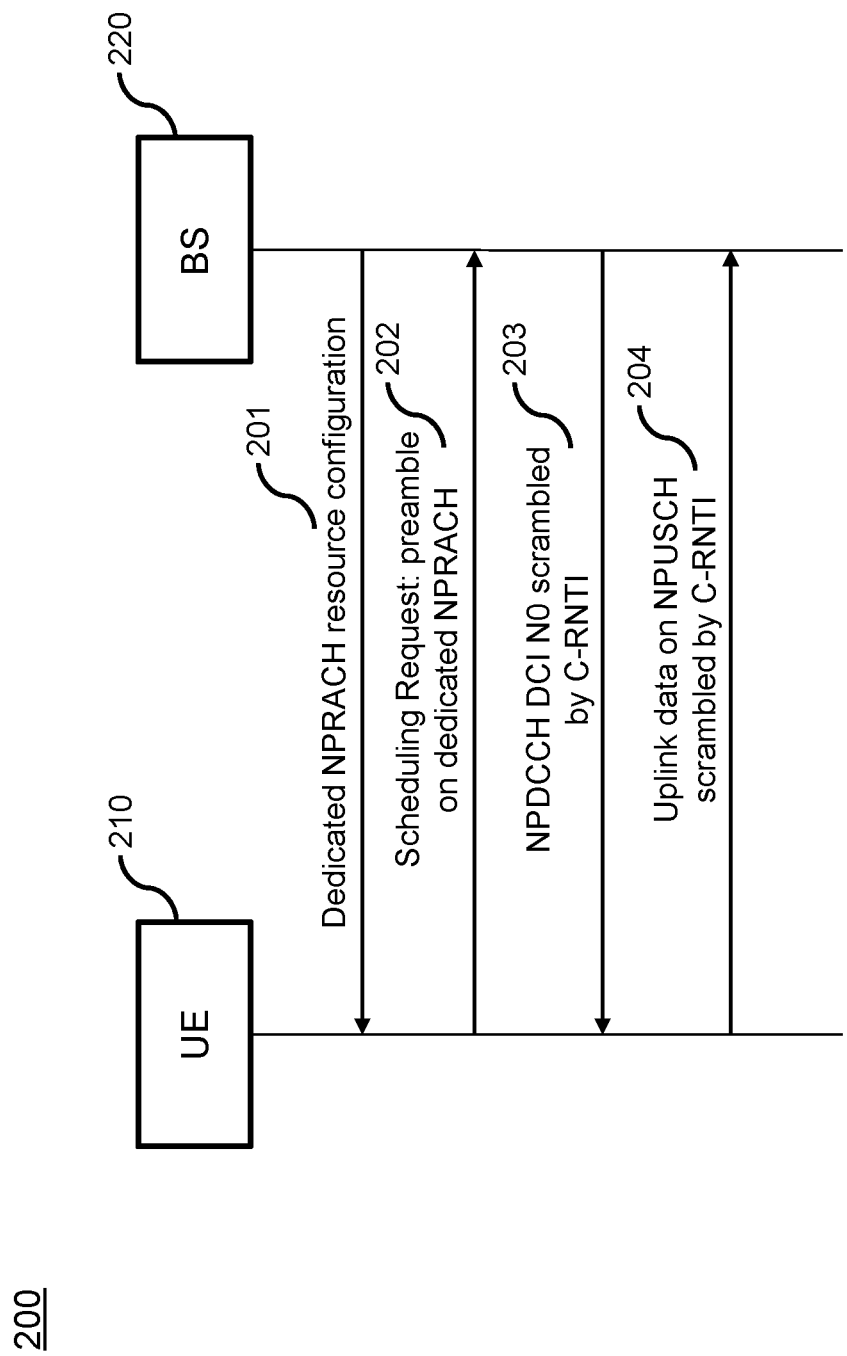
FIG. 2 illustrates an exemplary method for scheduling resources in response to a request, in accordance with some embodiments of the present disclosure.

FIG. 2 illustrates an exemplary method 200 for scheduling resources in response to a request, in accordance with some embodiments of the present disclosure. As shown in FIG. 2, the BS 220 in this example configures and transmits a dedicated NPRACH resource to the UE 210 at operation 201. The dedicated NPRACH resource is to be used by the UE 210 to transmit an uplink scheduling request, e.g. by a radio resource control (RRC) message. At operation 202, the UE 210 sends a random access preamble sequence on the dedicated NPRACH resource when the UE 210 wants to send an uplink scheduling request because the uplink data is to be transmitted while the BS 220 has not allocated the uplink resource. At operation 203, after detecting the random access preamble sequence on the UE-specific NPRACH resource, the BS 220 allocates an uplink transmission resource, and sends an NPDCCH DCI N0 carrying information about the uplink transmission resource to the UE 210. After satisfying a certain timing relationship based on an ending time of the transmitted random access preamble sequence on the dedicated NPRACH resource, the UE starts to listen to or monitor the NPDCCH DCI N0, and then transmits, at operation 204, the uplink data on the uplink transmission resource allocated at operation 203.

In operation 201 of the above example shown in FIG. 2, the dedicated NPRACH resource configured by the BS 220 may include e.g. a coverage level, a carrier ID, and a subcarrier ID. In operation 202 of the above example, the UE 210 may obtain a repetition number corresponding to the random access preamble sequence in a system message according to the carrier ID and the coverage level, and continuously transmit a repetition of the random access preamble sequence on the configured dedicated NPRACH resource.

In operation 203 of the above example shown in FIG. 2, a certain timing relationship needs to be met between a starting sub-frame of the NPDCCH and an ending sub-frame of the dedicated NPRACH in which the random access preamble sequence is detected. Similarly, in operation 204 of the above example, after the UE 210 sends the random access preamble sequence on the dedicated NPRACH resource, the UE starts listening to the NPDCCH after a certain timing according to the timing relationship in operation 203. The timing relationship may be, but not limited to, that: the start time of the NPDCCH after the UE 210 sends the random access preamble sequence on the dedicated NPRACH is the same as the start time of the random access response window after the UE sends the random access preamble sequence in the random access procedure according to an existing protocol.

In operation 203 of the above example shown in FIG. 2, after the BS 220 detects the random access preamble sequence on the UE-specific NPRACH resource from the UE 210, the BS 220 transmits the NPDCCH that is scrambled by a C-RNTI of the UE 210. In operation 204 of the above example, after transmitting the random access preamble sequence on the dedicated NPRACH resource, the UE 210 listens to the NPDCCH scrambled by the C-RNTI of the UE 210. If the UE 210 receives the NPDCCH DCI N0, the UE 210 may transmit the NPUSCH scrambled by the C-RNTI of the UE 210 on the allocated uplink resource.

In the above example, if the BS 220 configures a multi-process, e.g. two-process, function for the UE 210, the BS 220 may indicate the scheduled process ID in the NPDCCH DCI N0 in operation 203. After receiving the NPDCCH DCI N0, the UE 210 should use the indicated process ID in the DCI N0 to transmit uplink data in operation 204.

There may be different schemes for transmitting and receiving the NPDCCH in the operations 203 and 204 of the above example, according to various embodiments. In one embodiment, the BS 220 in operation 203 transmits the NPDCCH DCI N0 scrambled by the C-RNTI of the UE 210 in a dedicated search space specifically allocated to the UE 210. Then in operation 204, after transmitting the random access preamble sequence on the dedicated NPRACH resource, the UE 210 listens to the NPDCCH scrambled by the C-RNTI of the UE 210 in its dedicated search space. After receiving the NPDCCH DCI N0, the UE transmits the NPUSCH scrambled by the C-RNTI of the UE 210 on the allocated uplink resource.

In another embodiment, the BS 220 in operation 203 transmits the NPDCCH DCI N0 scrambled by the C-RNTI of the UE 210 in a common search space shared by a plurality of UEs including the UE 210. In operation 204, after transmitting the random access preamble sequence on the dedicated NPRACH resource, the UE 210 starts a timer for receiving the NPDCCH DCI N0 at the starting time of monitoring the NPDCCH. Within the timer or while the timer is running, the UE 210 listens to the NPDCCH scrambled by the C-RNTI of the UE 210 in the common search space.

If the UE 210 receives the NPDCCH DCI N0 scrambled by the C-RNTI of the UE 210 within the timer, the NPUSCH scrambled by the C-RNTI of the UE 210 is transmitted on the uplink resource allocated in operation 203. The UE 210 then starts to listen to the NPDCCH scrambled by the C-RNTI of the UE 210 in the dedicated search space. If the UE 210 does not receive the NPDCCH DCI N0 scrambled by the C-RNTI of the UE 210 within the timer, after the timer expires, the UE 210 starts to listen to the NPDCCH scrambled by the C-RNTI of the UE 210 in the dedicated search space.

If the UE 210 generates an additional uplink scheduling request within the timer, the additional uplink scheduling request is delayed until the timer expires and is then sent by the UE 210. When the additional uplink scheduling request is sent, the new random access preamble sequence of the additional uplink scheduling request may still be sent on the dedicated NPRACH resource. The number of repetitions of the new random access preamble sequence may be the same as or different from the number of repetitions of the old random access preamble sequence in the original request. The duration of the timer may be configured by the BS 220 through a message, and can be configured together with the dedicated NPRACH resource to the UE 210.

Figure 3:
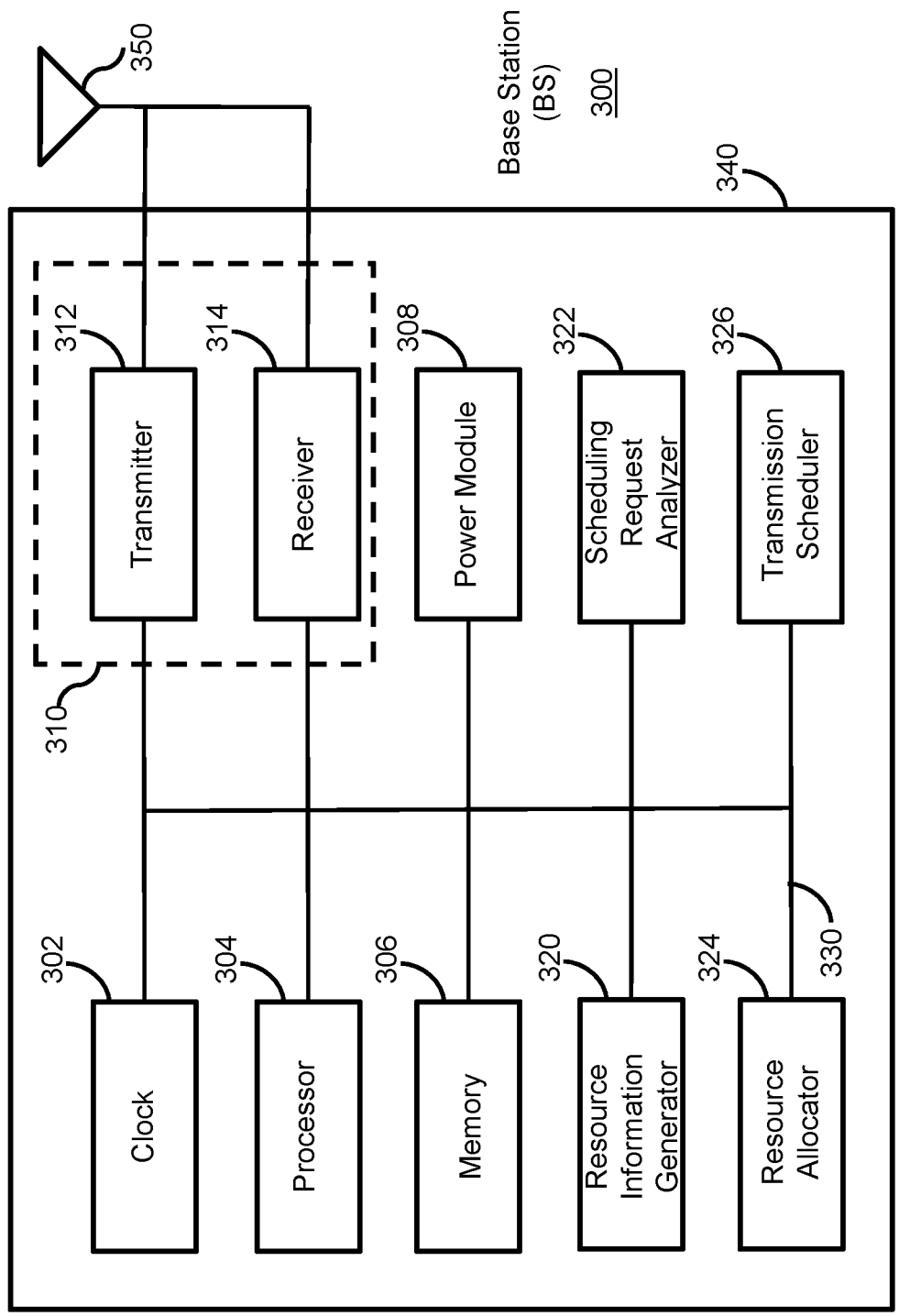
FIG. 3 illustrates a block diagram of a base station (BS), in accordance with some embodiments of the present disclosure.

FIG. 3 illustrates a block diagram of a base station (BS) 300, in accordance with some embodiments of the present disclosure. The BS 300 is an example of a node that can be configured to implement the various methods described herein. As shown in FIG. 3, the BS 300 includes a housing 340 containing a system clock 302, a processor 304, a memory 306, a transceiver 310 comprising a transmitter 312 and receiver 314, a power module 308, a resource information generator 320, a scheduling request analyzer 322, a resource allocator 324, and a transmission scheduler 326.

In this embodiment, the system clock 302 provides the timing signals to the processor 304 for controlling the timing of all operations of the BS 300. The processor 304 controls the general operation of the BS 300 and can include one or more processing circuits or modules such as a central processing unit (CPU) and/or any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable circuits, devices and/or structures that can perform calculations or other manipulations of data.

The memory 306, which can include both read-only memory (ROM) and random access memory (RAM), can provide instructions and data to the processor 304. A portion of the memory 306 can also include non-volatile random access memory (NVRAM). The processor 304 typically performs logical and arithmetic operations based on program instructions stored within the memory 306. The instructions (a.k.a., software) stored in the memory 306 can be executed by the processor 304 to perform the methods described herein. The processor 304 and memory 306 together form a processing system that stores and executes software. As used herein, "software" means any type of instructions, whether referred to as software, firmware, middleware, microcode, etc. which can configure a machine or device to perform one or more desired functions or processes. Instructions can include code (e.g., in source code format, binary code format, executable code format, or any other suitable format of code). The instructions, when executed by the one or more processors, cause the processing system to perform the various functions described herein.

The transceiver 310, which includes the transmitter 312 and receiver 314, allows the BS 300 to transmit and receive data to and from a remote device (e.g., another BS or a UE). An antenna 350 is typically attached to the housing 340 and electrically coupled to the transceiver 310. In various embodiments, the BS 300 includes (not shown) multiple transmitters, multiple receivers, and multiple transceivers. In one embodiment, the antenna 350 is replaced with a multi-antenna array 350 that can form a plurality of beams each of which points in a distinct direction. The transmitter 312 can be configured to wirelessly transmit packets having different packet types or functions, such packets being generated by the processor 304. Similarly, the receiver 314 is configured to receive packets having different packet types or functions, and the processor 304 is configured to process packets of a plurality of different packet types. For example, the processor 304 can be configured to determine the type of packet and to process the packet and/or fields of the packet accordingly.

In a communication system including the BS 300 serving a UE, the BS 300 may configure a dedicated resource for the UE to transmit a scheduling request. In general, the resource information generator 320 may generate and transmit, via the transmitter 312, first resource information to a UE. The first resource information comprises information related to a first resource associated with the UE. The first resource may be a resource of physical random access channel (PRACH) specifically allocated to the UE.

In one embodiment, the scheduling request analyzer 322 may receive, via the receiver 314, a request from the UE on the first resource for a data transmission between the BS 300 and the UE. The scheduling request analyzer 322 may analyze the request and send the analyzed request to the resource allocator 324 for allocating transmission resources. The resource allocator 324 in this example may allocate, to the UE, a second resource in response to the request. The second resource is configured to be utilized for the data transmission according to the request. The resource allocator 324 may send the allocated second resource to the resource information generator 320 for generating second resource information for transmitting to the UE.

In one example, the request is utilized for requesting an uplink transmission from the UE to the BS 300. Then based on the allocated second resource, the receiver 314 may receive data from the UE on the second resource. In another example, the request is utilized for requesting a downlink transmission from the BS 300 to the UE. Then based on the allocated second resource, the transmitter 312 may transmit data to the UE on the second resource.

In one embodiment, the resource information generator 320 may generate and transmit, via the transmitter 312 to the UE, a downlink control information (DCI) that indicates the second resource. The DCI may have a type or format determined based on the request.

In another embodiment, the resource information generator 320 may generate and transmit, via the transmitter 312 to the UE, second resource information based on a physical downlink control channel (PDCCH) scrambled by a cell radio network temporary identifier (C-RNTI) corresponding to the UE. The second resource information comprises information related to the second resource. In one example, the second resource information comprises information related to an identifier (ID) of one of a plurality of processes configured to the UE.

In one example, the second resource information is transmitted in a search space specific to the UE. The resource information generator 320 may further generate and transmit, via the transmitter 312, third resource information to the UE in the search space specific to the UE. The third resource information comprises information related to a third resource that is to be utilized for a data transmission between the BS 300 and the UE irrelevant to the request. For example, while the second resource is to be utilized for an uplink transmission, the third resource is to be utilized for a downlink transmission, or vice versa. In another example, the second resource information is transmitted in a search space common to a plurality of UEs including the UE.

The transmission scheduler 326 in this example may determine a starting time of the PDCCH based on an ending time of the PRACH that carries the request. The transmission scheduler 326 may inform the resource information generator 320 about the starting time, such that the second resource information is transmitted according to the starting time of the PDCCH.

In one embodiment, the scheduling request analyzer 322 may receive, via the receiver 314, an additional request from the UE on the first resource in response to an expiration of a timer at the UE. While the request includes a preamble repeated by a first number of times; the additional request may include a preamble repeated by either the first number of times or a second time of times different from the first number of times.

The power module 308 can include a power source such as one or more batteries, and a power regulator, to provide regulated power to each of the above-described modules in FIG. 3. In some embodiments, if the BS 300 is coupled to a dedicated external power source (e.g., a wall electrical outlet), the power module 308 can include a transformer and a power regulator.

The various modules discussed above are coupled together by a bus system 330. The bus system 330 can include a data bus and, for example, a power bus, a control signal bus, and/or a status signal bus in addition to the data bus. It is understood that the modules of the BS 300 can be operatively coupled to one another using any suitable techniques and mediums.

Although a number of separate modules or components are illustrated in FIG. 3, persons of ordinary skill in the art will understand that one or more of the modules can be combined or commonly implemented. For example, the processor 304 can implement not only the functionality described above with respect to the processor 304, but also implement the functionality described above with respect to the resource information generator 320. Conversely, each of the modules illustrated in FIG. 3 can be implemented using a plurality of separate components or elements.

Figure 4:
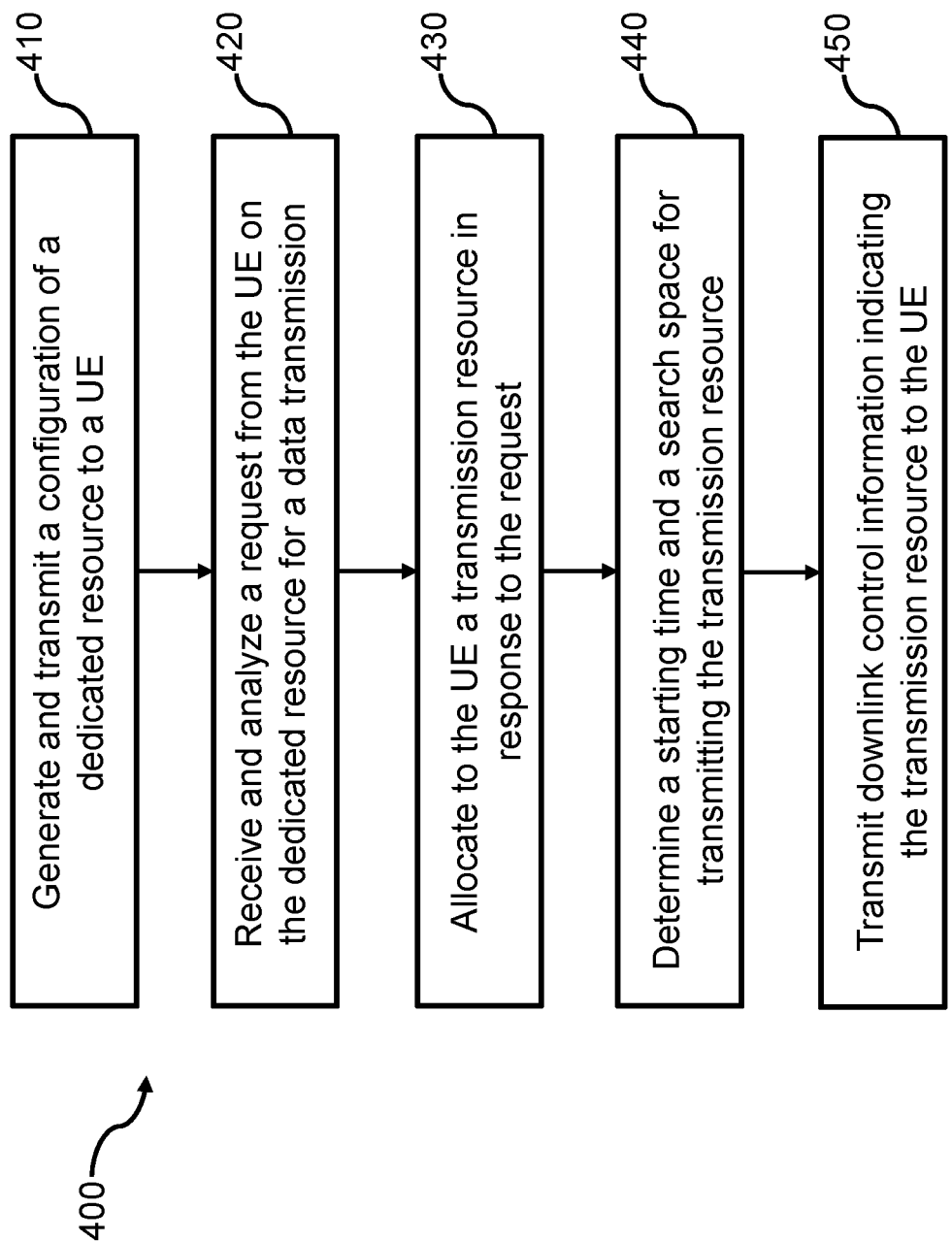
FIG. 4 illustrates a flow chart for a method performed by a BS for scheduling resources, in accordance with some embodiments of the present disclosure.

FIG. 4 illustrates a flow chart for a method 400 performed by a BS, e.g. the BS 300 in FIG. 3, for scheduling resources, in accordance with some embodiments of the present disclosure. At operation 410, the BS generates and transmits a configuration of a dedicated resource to a UE. At operation 420, the BS receives and analyzes a request from the UE on the dedicated resource for a data transmission. At operation 430, the BS allocates to the UE a transmission resource in response to the request. At operation 440, the BS determines a starting time and a search space for transmitting the transmission resource. At operation 450, the BS transmits downlink control information indicating the transmission resource to the UE.

Figure 5:
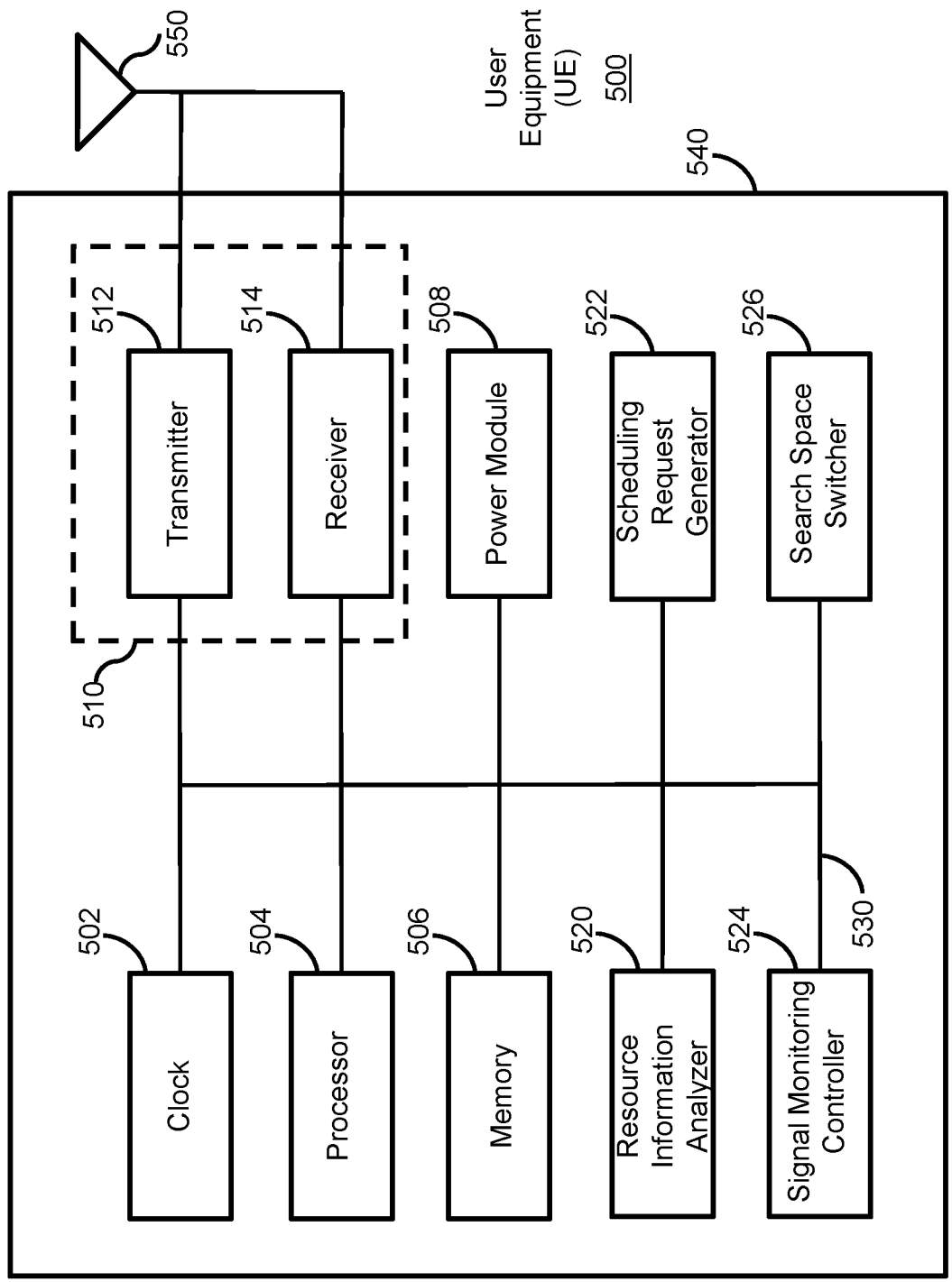
FIG. 5 illustrates a block diagram of a user equipment (UE), in accordance with some embodiments of the present disclosure.

FIG. 5 illustrates a block diagram of a user equipment (UE) 500, in accordance with some embodiments of the present disclosure. The UE 500 is an example of a device that can be configured to implement the various methods described herein. As shown in FIG. 5, the UE 500 includes a housing 540 containing a system clock 502, a processor 504, a memory 506, a transceiver 510 comprising a transmitter 512 and a receiver 514, a power module 508, a resource information analyzer 520, a scheduling request generator 522, a signal monitoring controller 524, and a search space switcher 526.

In this embodiment, the system clock 502, the processor 504, the memory 506, the transceiver 510 and the power module 508 work similarly to the system clock 302, the processor 304, the memory 306, the transceiver 310 and the power module 308 in the BS 300. An antenna 550 or a multi-antenna array 550 is typically attached to the housing 440 and electrically coupled to the transceiver 510.

In a communication system, the UE 500 may be associated with a BS. In one embodiment, the resource information analyzer 520 may receive, via the receiver 514, first resource information from the BS. The first resource information comprises information related to a first resource associated with the UE 500. The first resource may be a resource of physical random access channel (PRACH) specifically allocated to the UE 500.

In one embodiment, the scheduling request generator 522 may generate and transmit, via the transmitter 512, a request to the BS on the first resource for a data transmission between the BS and the UE 500. The request is configured to be utilized by the BS to allocate a second resource to the UE 500. The second resource is configured for the data transmission according to the request. The scheduling request generator 522 may inform the signal monitoring controller 524 about the PRACH that carries the request for determining a starting time for monitoring.

The signal monitoring controller 524 in this example can determine a starting time for monitoring a PDCCH based on an ending time of the PRACH that carries the request; start a timer at the starting time; and inform the resource information analyzer 520 to monitor, via the receiver 514, the PDCCH from the starting time until the timer expires.

In one embodiment, the resource information analyzer 520 may receive, while monitoring the PDCCH, second resource information from the BS based on the PDCCH scrambled by a cell radio network temporary identifier (C-RNTI) corresponding to the UE 500. The second resource information comprises information related to the second resource. In one example, the second resource information comprises information related to an identifier (ID) of one of a plurality of processes configured to the UE 500. In one embodiment, the resource information analyzer 520 may receive, via the receiver 514 from the BS, a downlink control information (DCI) that indicates the second resource. The DCI may have a type or format determined based on the request.

In one example, the request is utilized for requesting an uplink transmission from the UE 500 to the BS. Then based on the allocated second resource, the transmitter 512 may transmit data to the BS on the second resource. In another example, the request is utilized for requesting a downlink transmission from the BS to the UE 500. Then based on the allocated second resource, the receiver 514 may receive data from the BS on the second resource.

The search space switcher 526 in this example can switch the monitoring search space between a dedicated search space specific to the UE 500 and a common search space shared by and common to a plurality of UEs including the UE 500. In one embodiment, the second resource information is received in a dedicated search space. Further, the resource information analyzer 520 may receive, via the receiver 514, third resource information from the UE in the dedicated search space specific to the UE. The third resource information comprises information related to a third resource that is to be utilized for a data transmission between the BS and the UE 500 irrelevant to the request. For example, while the second resource is to be utilized for an uplink transmission, the third resource is to be utilized for a downlink transmission, or vice versa.

In another example, the second resource information is received in a common search space common to a plurality of UEs including the UE 500. After receiving the second resource information in the common search space, the signal monitoring controller 524 may instruct the search space switcher 526 to switch to the dedicated search space and instruct the resource information analyzer 520 to monitor, via the receiver 514, the PDCCH in the dedicated search space specific to the UE 500.

In one embodiment, the resource information analyzer 520 and/or the signal monitoring controller 524 may determine that no second resource information is received while monitoring the PDCCH. The scheduling request generator 522 may transmit, via the transmitter 512, an additional request to the BS on the first resource in response to an expiration of the timer. In one example, the additional request is generated in response to the expiration of the timer. In another example, the additional request is generated before the timer expires and delayed for transmission after the timer expires. While the request includes a preamble repeated by a first number of times; the additional request may include a preamble repeated by either the first number of times or a second time of times different from the first number of times.

In another embodiment, the resource information analyzer 520 and/or the signal monitoring controller 524 may determine that no second resource information is received while monitoring the PDCCH in a common search space common to a plurality of UEs including the UE 500. Then in response to an expiration of the timer, the signal monitoring controller 524 may instruct the search space switcher 526 to switch to the dedicated search space and instruct the resource information analyzer 520 to monitor, via the receiver 514, the PDCCH in the dedicated search space specific to the UE 500.

The various modules discussed above are coupled together by a bus system 530. The bus system 530 can include a data bus and, for example, a power bus, a control signal bus, and/or a status signal bus in addition to the data bus. It is understood that the modules of the UE 500 can be operatively coupled to one another using any suitable techniques and mediums.

Although a number of separate modules or components are illustrated in FIG. 5, persons of ordinary skill in the art will understand that one or more of the modules can be combined or commonly implemented. For example, the processor 504 can implement not only the functionality described above with respect to the processor 504, but also implement the functionality described above with respect to the resource information analyzer 520. Conversely, each of the modules illustrated in FIG. 5 can be implemented using a plurality of separate components or elements.

Figure 6:
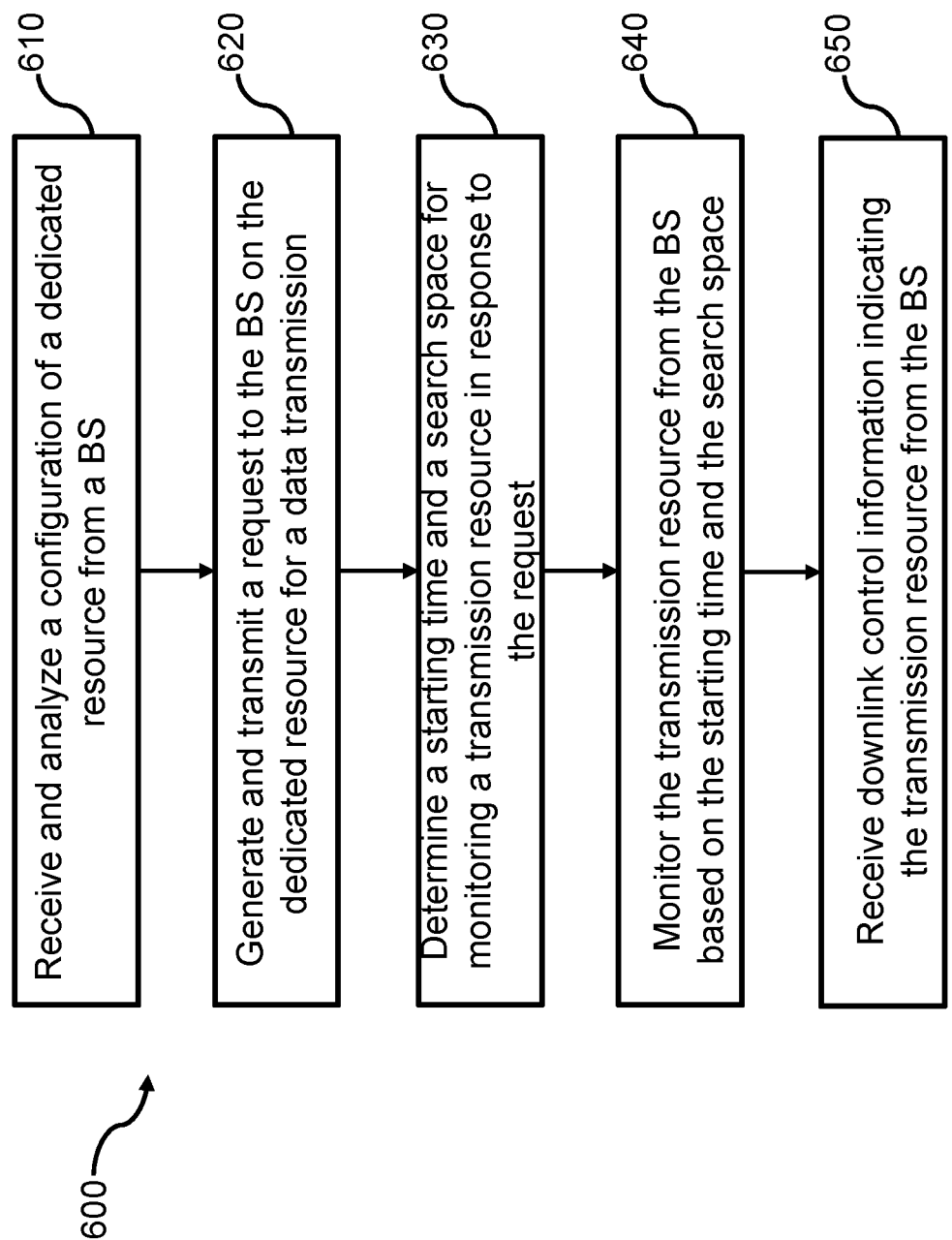
FIG. 6 illustrates a flow chart for a method performed by a UE for determining scheduled resources, in accordance with some embodiments of the present disclosure.

FIG. 6 illustrates a flow chart for a method 600 performed by a UE, e.g. the UE 500 in FIG. 5, for determining scheduled resources, in accordance with some embodiments of the present disclosure. At operation 610, the UE receives and analyzes a configuration of a dedicated resource from a BS. At operation 620, the UE generates and transmits a request to the BS on the dedicated resource for a data transmission. At operation 630, the UE determines a starting time and a search space for monitoring a transmission resource in response to the request. At operation 640, the UE monitors the transmission resource from the BS based on the starting time and the search space. At operation 650, the UE receives downlink control information indicating the transmission resource from the BS.

Different embodiments of the present disclosure will now be described in detail hereinafter. It is noted that the features of the embodiments and examples in the present disclosure may be combined with each other in any manner without conflict.

Figure 7:
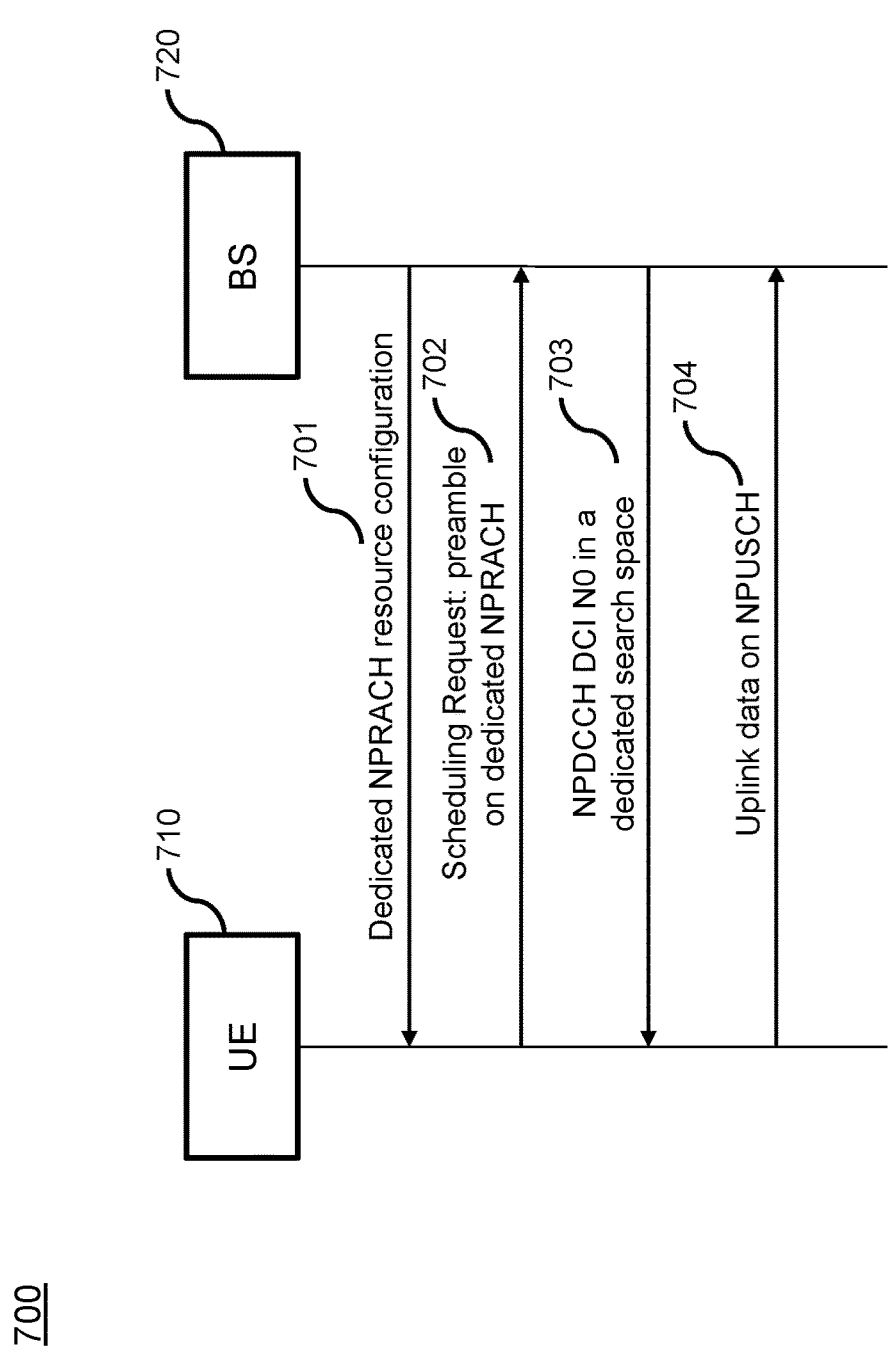
FIG. 7 illustrates an exemplary method for scheduling an uplink transmission resource in response to a request, in accordance with some embodiments of the present disclosure.

FIG. 7 illustrates an exemplary method 700 for scheduling an uplink transmission resource in response to a request, in accordance with a first embodiment of the present disclosure. In the first embodiment, the BS 720 configures parameters related to a dedicated search space of the terminal (UE 710) through a message such as RCConnectionReconfiguration or RRCConnectionReestablishment or RRCConnectionResume or RRCConnectionSetup. The BS 720 configures, by using an RRCConnectionReconfiguration or an RRCConnectionReestablishment or an RRCConnectionResume or an RRCConnectionSetup, a dedicated NPRACH resource for the UE 710 to transmit an uplink scheduling request. The configuration of the dedicated NPRACH resource may include a carrier, a subcarrier, a coverage level, etc., where the NPRACH is located. At operation 701, the BS 720 transmits the configuration of the dedicated NPRACH resource to the UE 710.

The UE 710 obtains the C-RNTI allocated by the BS 720 after the random access is completed. When the UE 710 has uplink data to be sent but the BS 720 has not allocated the uplink resource, the UE 710 generates an uplink scheduling request including a random access preamble sequence repeated by a number of times configured according to a system message or a dedicated signaling message, and transmits, at operation 702 on the dedicated NPRACH resource to the BS 720, the preamble sequence of random access.

After the UE 710 sends the random access preamble sequence on the dedicated NPRACH resource, the UE 710 calculates a starting time of listening to the NPDCCH. In one embodiment, assuming that an ending time of the UE 710 transmitting the random access preamble sequence on the dedicated NPRACH is n, then: (1) if the number of repetitions of the NPRACH is less than 64, the starting time of listening to the NPDCCH is n+4; and (2) if the number of NPRACH repetitions is greater than or equal to 64, the starting time of listening to NPDCCH is n+41.

From the starting time, the UE 710 starts to listen to NPDCCH scrambled by its C-RNTI in its dedicated search space. After detecting the random access preamble sequence on the dedicated NPRACH resource, the BS 720 allocates an uplink resource, and transmits, at operation 703, an NPDCCH DCI N0 scrambled by the C-RNTI of the UE 710 in the dedicated search space of the UE 710. The starting time of the transmitted NPDCCH should meet the time requirement for the UE 710 to listen to the NPDCCH.

After the UE 710 receives the NPDCCH DCI N0, the UE 710 transmits, at operation 704, NPUSCH scrambled by its C-RNTI on the uplink resource allocated by the BS 720. If the BS 720 configures a multi-HARQ-process (e.g. 2-HARQ-process) capability, the BS 720 may indicate an HARQ process ID in the NPDCCH DCI N0 transmitted to the UE 710. The UE 710 transmits the NPUSCH in operation 704 using the HARQ process ID indicated by the BS 720.

Figure 8:
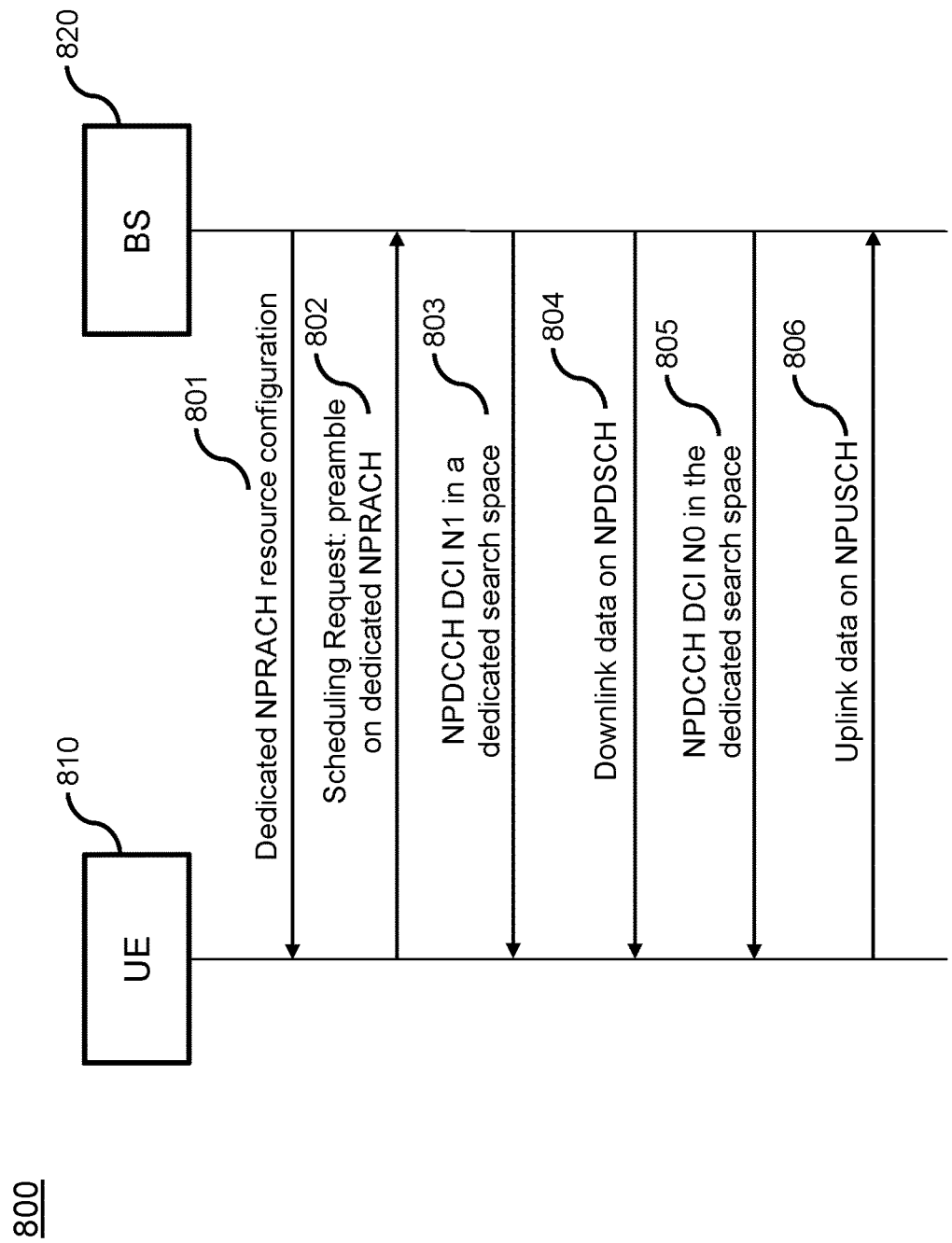
FIG. 8 illustrates another exemplary method for scheduling an uplink transmission resource in response to a request, in accordance with some embodiments of the present disclosure.

FIG. 8 illustrates another exemplary method 800 for scheduling an uplink transmission resource in response to a request, in accordance with a second embodiment of the present disclosure. In the second embodiment, the BS 820 configures parameters related to a dedicated search space of the terminal (UE 810) through a message such as RCConnectionReconfiguration or RRCConnectionReestablishment or RRCConnectionResume or RRCConnectionSetup. The BS 820 configures, by using an RRCConnectionReconfiguration or an RRCConnectionReestablishment or an RRCConnectionResume or an RRCConnectionSetup, a dedicated NPRACH resource for the UE 810 to transmit an uplink scheduling request. The configuration of the dedicated NPRACH resource may include a carrier, a subcarrier, a coverage level, etc., where the NPRACH is located. At operation 801, the BS 820 transmits the configuration of the dedicated NPRACH resource to the UE 810.

The UE 810 obtains the C-RNTI allocated by the BS 820 after the random access is completed. When the UE 810 has uplink data to be sent but the BS 820 has not allocated the uplink resource, the UE 810 generates an uplink scheduling request including a random access preamble sequence repeated by a number of times configured according to a system message or a dedicated signaling message, and transmits, at operation 802 on the dedicated NPRACH resource to the BS 820, the preamble sequence of random access.

After the UE 810 sends the random access preamble sequence on the dedicated NPRACH resource, the UE 810 calculates a starting time of listening to the NPDCCH. In one embodiment, assuming that an ending time of the UE 810 transmitting the random access preamble sequence on the dedicated NPRACH is n, then: (1) if the number of repetitions of the NPRACH is less than 64, the starting time of listening to the NPDCCH is n+4; and (2) if the number of NPRACH repetitions is greater than or equal to 64, the starting time of listening to NPDCCH is n+41.

From the starting time, the UE 810 starts to listen to NPDCCH scrambled by its C-RNTI in its dedicated search space. The UE 810 receives the C-RNTI-scrambled NPDCCH DCI N1 at operation 803. Then the UE 810 receives, at operation 804, downlink data on the downlink resource allocated by the BS 820.

After detecting the random access preamble sequence on the dedicated NPRACH resource, the BS 820 allocates an uplink resource, and transmits, at operation 805, an NPDCCH DCI N0 scrambled by the C-RNTI of the UE 810 in the dedicated search space of the UE 810. The starting time of the transmitted NPDCCH should meet the time requirement for the UE 810 to listen to the NPDCCH.

After the UE 810 receives the NPDCCH DCI N0, the UE 810 transmits, at operation 806, NPUSCH scrambled by its C-RNTI on the uplink resource allocated by the BS 820. If the BS 820 configures a multi-HARQ-process (e.g. 2-HARQ-process) capability, the BS 820 may indicate an HARQ process ID in the NPDCCH DCI N0 transmitted to the UE 810. The UE 810 transmits the NPUSCH in operation 806 using the HARQ process ID indicated by the BS 820.

Figure 9:
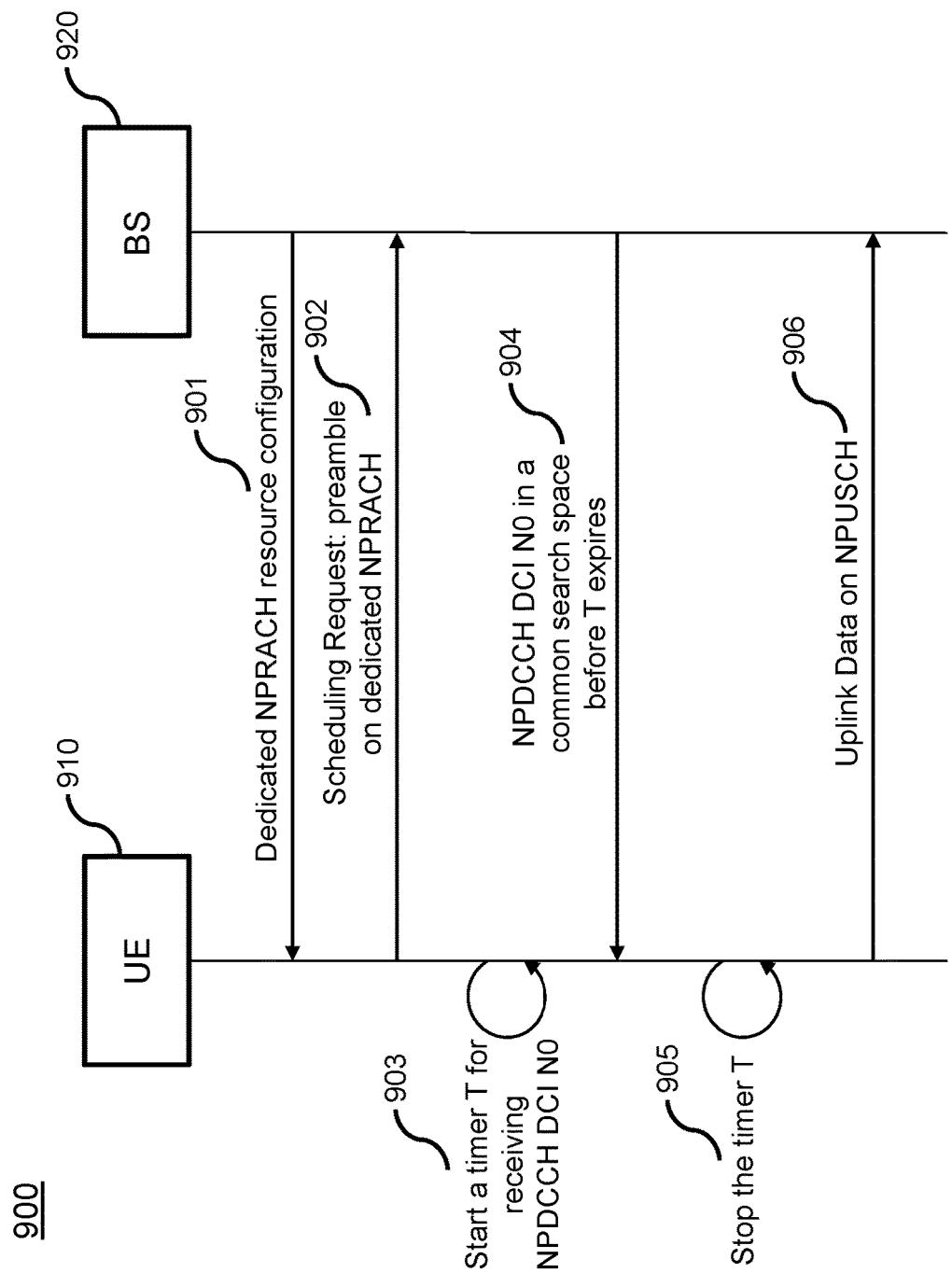
FIG. 9 illustrates an exemplary method for scheduling an uplink transmission resource based on a timer, in accordance with some embodiments of the present disclosure.

FIG. 9 illustrates an exemplary method 900 for scheduling an uplink transmission resource based on a timer, in accordance with a third embodiment of the present disclosure. In the third embodiment, the BS 920 configures relevant parameters of a common search space through the SIB2, and configures parameters related to a dedicated search space of the terminal (UE 910) through a message such as RCConnectionReconfiguration or RRCConnectionReestablishment or RRCConnectionResume or RRCConnectionSetup. The BS 920 configures, by using an RRCConnectionReconfiguration or an RRCConnectionReestablishment or an RRCConnectionResume or an RRCConnectionSetup, a dedicated NPRACH resource for the UE 910 to transmit an uplink scheduling request. The configuration of the dedicated NPRACH resource may include a carrier, a subcarrier, a coverage level, etc., where the NPRACH is located. At operation 901, the BS 920 transmits the configuration of the dedicated NPRACH resource to the UE 910.

The UE 910 obtains the C-RNTI allocated by the BS 920 after the random access is completed. When the UE 910 has uplink data to be sent but the BS 920 has not allocated the uplink resource, the UE 910 generates an uplink scheduling request including a random access preamble sequence repeated by a number of times configured according to a system message or a dedicated signaling message, and transmits, at operation 902 on the dedicated NPRACH resource to the BS 920, the preamble sequence of random access.

After the UE 910 sends the random access preamble sequence on the dedicated NPRACH resource, the UE 910 calculates a starting time of listening to the NPDCCH. In one embodiment, assuming that an ending time of the UE 910 transmitting the random access preamble sequence on the dedicated NPRACH is n, then: (1) if the number of repetitions of the NPRACH is less than 64, the starting time of listening to the NPDCCH is n+4; and (2) if the number of NPRACH repetitions is greater than or equal to 64, the starting time of listening to NPDCCH is n+41.

From the starting time calculated above, the UE 910 starts, at operation 903, a timer T for uplink scheduling monitoring, and listens to NPDCCH scrambled by its C-RNTI in the common search space corresponding to its coverage level.

After detecting the random access preamble sequence on the dedicated NPRACH resource, the BS 920 allocates an uplink resource, and transmits, at operation 904, an NPDCCH DCI N0 scrambled by the C-RNTI of the UE 910 in the common search space corresponding to the coverage level of the UE 910. The starting time of the transmitted NPDCCH should meet the time requirement for the UE 910 to listen to the NPDCCH.

Before the timer T times out or expires, the UE 910 receives the NPDCCH DCI N0 at operation 904. Then the UE 910 stops the timer T at operation 905, and transmits at operation 906 the NPUSCH scrambled by its C-RNTI on the uplink resource allocated by the BS. After the NPUSCH transmission is completed, the UE 910 may switch to the dedicated and UE-specific search space to listen to NPDCCH scrambled by its C-RNTI.

If the BS 920 configures a multi-HARQ-process (e.g. 2-HARQ-process) capability, the BS 920 may indicate an HARQ process ID in the NPDCCH DCI N0 transmitted to the UE 910. The UE 910 transmits the NPUSCH in operation 906 using the HARQ process ID indicated by the BS 920. The duration of the timer T may be the same as the length of the random access response window configured by the BS 920, or may be configured by the BS 920 and sent to the UE 910 together with the dedicated NPRACH resource at operation 901.

Figure 10:
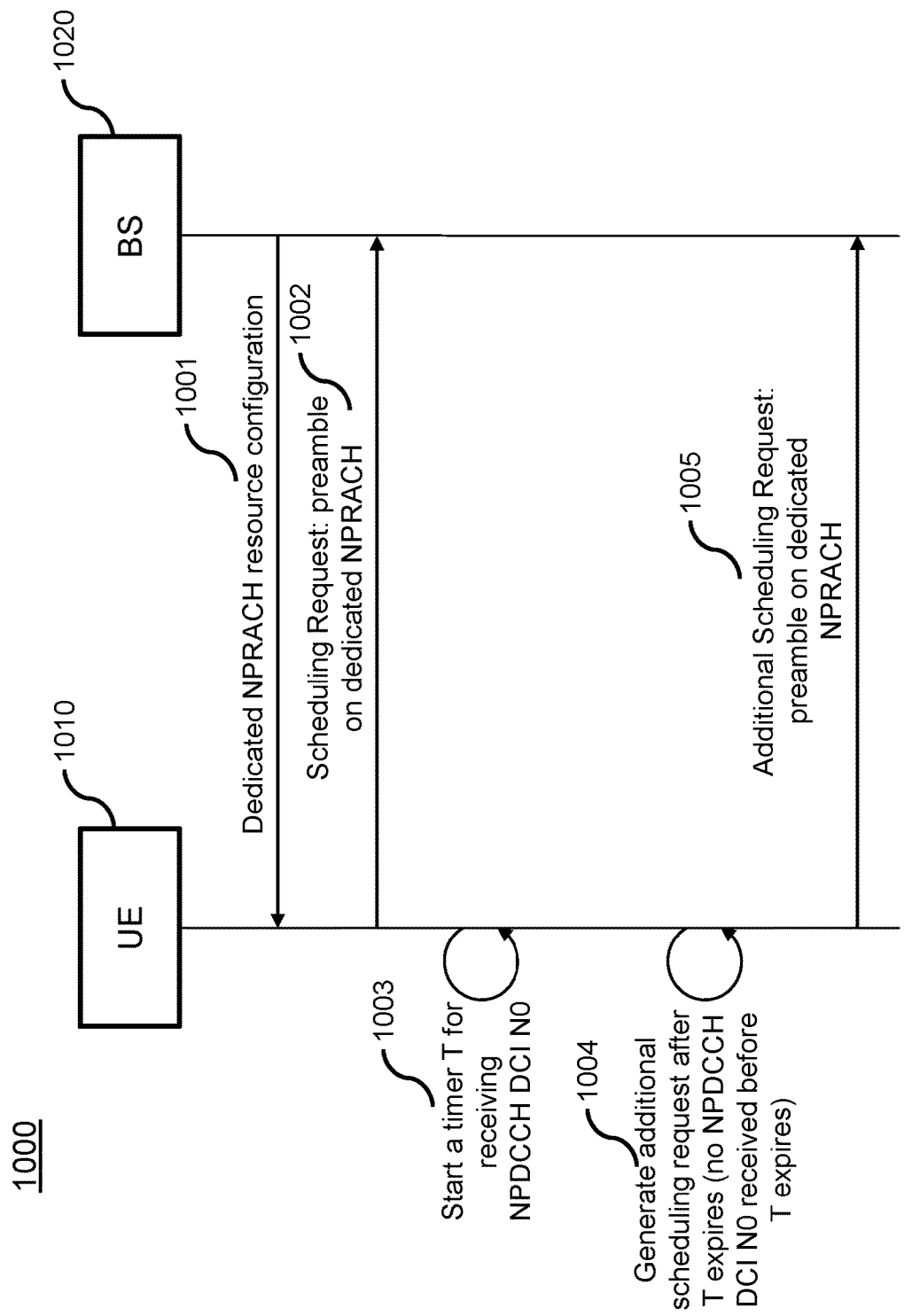
FIG. 10 illustrates another exemplary method for scheduling an uplink transmission resource based on a timer, in accordance with some embodiments of the present disclosure.

FIG. 10 illustrates another exemplary method 1000 for scheduling an uplink transmission resource based on a timer, in accordance with a fourth embodiment of the present disclosure. In the fourth embodiment, the BS 1020 configures relevant parameters of a common search space through the SIB2, and configures parameters related to a dedicated search space of the terminal (UE 1010) through a message such as RCConnectionReconfiguration or RRCConnectionReestablishment or RRCConnectionResume or RRCConnectionSetup. The BS 1020 configures, by using an RRCConnectionReconfiguration or an RRCConnectionReestablishment or an RRCConnectionResume or an RRCConnectionSetup, a dedicated NPRACH resource for the UE 1010 to transmit an uplink scheduling request. The configuration of the dedicated NPRACH resource may include a carrier, a subcarrier, a coverage level, etc., where the NPRACH is located. At operation 1001, the BS 1020 transmits the configuration of the dedicated NPRACH resource to the UE 1010.

The UE 1010 obtains the C-RNTI allocated by the BS 1020 after the random access is completed. When the UE 1010 has uplink data to be sent but the BS 1020 has not allocated the uplink resource, the UE 1010 generates an uplink scheduling request including a random access preamble sequence repeated by a number of times configured according to a system message or a dedicated signaling message, and transmits, at operation 1002 on the dedicated NPRACH resource to the BS 1020, the preamble sequence of random access.

After the UE 1010 sends the random access preamble sequence on the dedicated NPRACH resource, the UE 1010 calculates a starting time of listening to the NPDCCH. In one embodiment, assuming that an ending time of the UE 1010 transmitting the random access preamble sequence on the dedicated NPRACH is n, then: (1) if the number of repetitions of the NPRACH is less than 64, the starting time of listening to the NPDCCH is n+4; and (2) if the number of NPRACH repetitions is greater than or equal to 64, the starting time of listening to NPDCCH is n+41.

From the starting time calculated above, the UE 1010 starts, at operation 1003, a timer T for uplink scheduling monitoring, and listens to NPDCCH scrambled by its C-RNTI in the common search space corresponding to its coverage level.

After detecting the random access preamble sequence on the dedicated NPRACH resource, the BS 1020 allocates an uplink resource, and may or may not transmit an NPDCCH DCI N0 scrambled by the C-RNTI of the UE 1010 in the common search space corresponding to the coverage level of the UE 1010. The starting time of the NPDCCH, if transmitted by the BS 1020, should meet the time requirement for the UE 1010 to listen to the NPDCCH.

In this embodiment, when the timer T expires or times out, the UE 1010 has not received the NPDCCH DCI N0. The UE 1010 then switches to the dedicated search space specific to the UE 1010 to listen to the NPDCCH scrambled by its C-RNTI.

Because the UE 1010 does not receive any uplink scheduling, the UE re-generates, at operation 1004, a random access preamble sequence, repeated by a number of times configured according to a system message or a dedicated signaling message, and transmits, at operation 1005, the regenerated and repeated random access preamble sequence as an additional scheduling request on the dedicated NPRACH resource to the BS 1020.

The duration of the timer T may be the same as the length of the random access response window configured by the BS 1020, or may be configured by the BS 1020 and sent to the UE 1010 together with the dedicated NPRACH resource at operation 1001.

Figure 11:
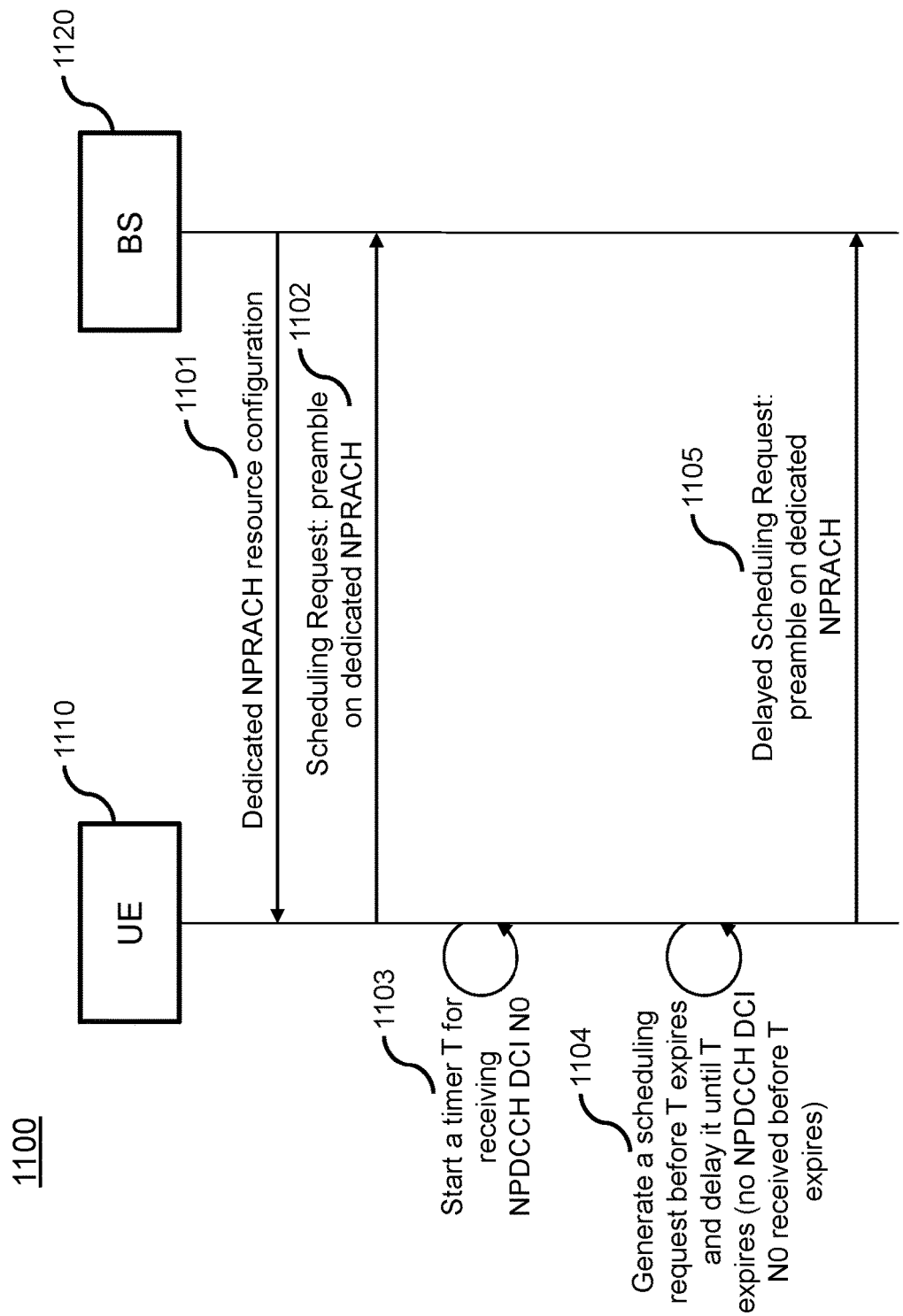
FIG. 11 illustrates yet another exemplary method for scheduling an uplink transmission resource based on a timer, in accordance with some embodiments of the present disclosure.

FIG. 11 illustrates yet another exemplary method 1100 for scheduling an uplink transmission resource based on a timer, in accordance with a fifth embodiment of the present disclosure. In the fifth embodiment, the BS 1120 configures relevant parameters of a common search space through the SIB2, and configures parameters related to a dedicated search space of the terminal (UE 1110) through a message such as RCConnectionReconfiguration or RRCConnection-Reestablishment or RRCConnectionResume or RRCConnectionSetup. The BS 1120 configures, by using an RRC-ConnectionReconfiguration or an RRCConnectionReestablishment or an RRCConnectionResume or an RRCConnectionSetup, a dedicated NPRACH resource for the UE 1110 to transmit an uplink scheduling request. The configuration of the dedicated NPRACH resource may include a carrier, a subcarrier, a coverage level, etc., where the NPRACH is located. At operation 1101, the BS 1120 transmits the configuration of the dedicated NPRACH resource to the UE 1110.

The UE 1110 obtains the C-RNTI allocated by the BS 1120 after the random access is completed. When the UE 1110 has uplink data to be sent but the BS 1120 has not allocated the uplink resource, the UE 1110 generates an uplink scheduling request including a random access preamble sequence repeated by a number of times configured according to a system message or a dedicated signaling message, and transmits, at operation 1102 on the dedicated NPRACH resource to the BS 1120, the preamble sequence of random access.

After the UE 1110 sends the random access preamble sequence on the dedicated NPRACH resource, the UE 1110 calculates a starting time of listening to the NPDCCH. In one embodiment, assuming that an ending time of the UE 1110 transmitting the random access preamble sequence on the dedicated NPRACH is n, then: (1) if the number of repetitions of the NPRACH is less than 64, the starting time of listening to the NPDCCH is n+4; and (2) if the number of NPRACH repetitions is greater than or equal to 64, the starting time of listening to NPDCCH is n+41.

From the starting time calculated above, the UE 1110 starts, at operation 1103, a timer T for uplink scheduling monitoring, and listens to NPDCCH scrambled by its C-RNTI in the common search space corresponding to its coverage level.

After detecting the random access preamble sequence on the dedicated NPRACH resource, the BS 1120 allocates an uplink resource, and may or may not transmit an NPDCCH DCI N0 scrambled by the C-RNTI of the UE 1110 in the common search space corresponding to the coverage level of the UE 1110. The starting time of the NPDCCH, if transmitted by the BS 1120, should meet the time requirement for the UE 1110 to listen to the NPDCCH.

In this embodiment, before the timer T stops or expires, the UE 1110 does not receive the NPDCCH DCI N0 and generates, at operation 1104, an additional uplink scheduling request. The UE 1110 in this case does not process the newly generated uplink scheduling request. When the timer T expires or times out, the UE 1110 has not received the NPDCCH DCI N0. Then the UE 1110 processes the delayed uplink scheduling request in operation 1104. That is, the UE 1110 transmits, at operation 1105, the delayed scheduling request, which includes a regenerated random access preamble sequence repeated by a number of times configured according to a system message or a dedicated signaling message, on the dedicated NPRACH resource to the BS 1120. The duration of the timer T may be the same as the length of the random access response window configured by the BS 1120, or may be configured by the BS 1120 and sent to the UE 1110 together with the dedicated NPRACH resource at operation 1101.

While the above embodiments describe uplink transmission requests, the same methods may be utilized for downlink transmission requests as well.

In one embodiment, after the terminal transmits an uplink scheduling request on PRACH, the terminal starts a timer to listen to and receive PDCCH within the timer. The PDCCH in this embodiment schedules a downlink random access response (RAR) message that carries the uplink resource information. The terminal sends the uplink data on the scheduled uplink resource. The PDCCH may be sent in the common search space and scrambled by the RA-RNTI. The operations after the timer expires may be similar to any of above relevant embodiments. Specifically, in this embodiment, after the timer expires, whether to initiate an additional request is determined by the trigger source instead of the terminal itself. If the request is generated again by the trigger source, it will be sent. Otherwise, the process is done, and there is no need to send a request on PRACH again. While the requests in the above embodiments are for uplink or downlink data transmissions, the disclosed methods are also applicable to other requests or indications from a UE, e.g. a beam failure indication, a link failure indication, a switching request, a service type report, a location update request, etc.

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand exemplary features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques.

To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, module, etc. can be configured to perform one or more of the functions described herein. The term "configured to" or "configured for" as used herein with respect to a specified operation or function refers to a processor, device, component, circuit, structure, machine, module, etc. that is physically constructed, programmed and/or arranged to perform the specified operation or function.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present disclosure.

Additionally, memory or other storage, as well as communication components, may be employed in embodiments of the present disclosure. It will be appreciated that, for clarity purposes, the above description has described embodiments of the present disclosure with reference to different functional units and processors. However, it will be apparent that any suitable distribution of functionality between different functional units, processing logic elements or domains may be used without detracting from the present disclosure. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A method performed by a wireless communication device, the method comprising:
   receiving first resource information from a wireless communication node, wherein the first resource information comprises information related to a first resource associated with the wireless communication device;
   transmitting, to the wireless communication node, a request on the first resource for a data transmission between the wireless communication node and the wireless communication device;
   receiving second resource information from the wireless communication node, wherein the second resource information comprises information related to a second resource, wherein the second resource is configured for the data transmission according to the request, and
   in response to expiration of a predetermined timer and the second resource information not being received, switching from a common search space, allocated to a plurality of wireless communication devices including the wireless communication device, to a dedicated search space allocated only to the wireless communication device for monitoring and receiving the second resource information.

2. The method of claim 1, further comprising:
   receiving, from the wireless communication node, a downlink control information (DCI) that indicates the second resource.

3. The method of claim 2, wherein the DCI has a format determined based on the request.

4. The method of claim 1, wherein the first resource is a resource of physical random access channel (PRACH) specifically allocated to the wireless communication device.

5. The method of claim 4, further comprising:

determining a starting time for monitoring a physical downlink control channel (PDCCH) based on an ending time of the PRACH that carries the request;

starting a timer at the starting time; and monitoring the PDCCH from the starting time until the timer expires.

6. The method of claim 5, further comprising:

receiving, while monitoring the PDCCH, second resource information from the wireless communication node based on the PDCCH scrambled by a cell radio network temporary identifier (C-RNTI) corresponding to the wireless communication device, wherein the second resource information comprises information related to the second resource.

7. The method of claim 6, wherein:

the second resource information comprises information related to an identifier (ID) of one of a plurality of processes.

8. The method of claim 6, wherein:

the second resource information is received in a search space specific to the wireless communication device.

9. The method of claim 8, further comprising:

receiving third resource information from the wireless communication node in the search space specific to the wireless communication device, wherein the third resource information comprises information related to a third resource for a data transmission between the wireless communication node and the wireless communication device irrelevant to the request.

10. The method of claim 6, wherein:

the second resource information is received in a search space common to a plurality of wireless communication devices including the wireless communication device.

* * * * *